Jan. 3, 1928.
G. B. COLEMAN
1,654,790
ANTIFRICTION BRAKE
Filed Dec. 9, 1924
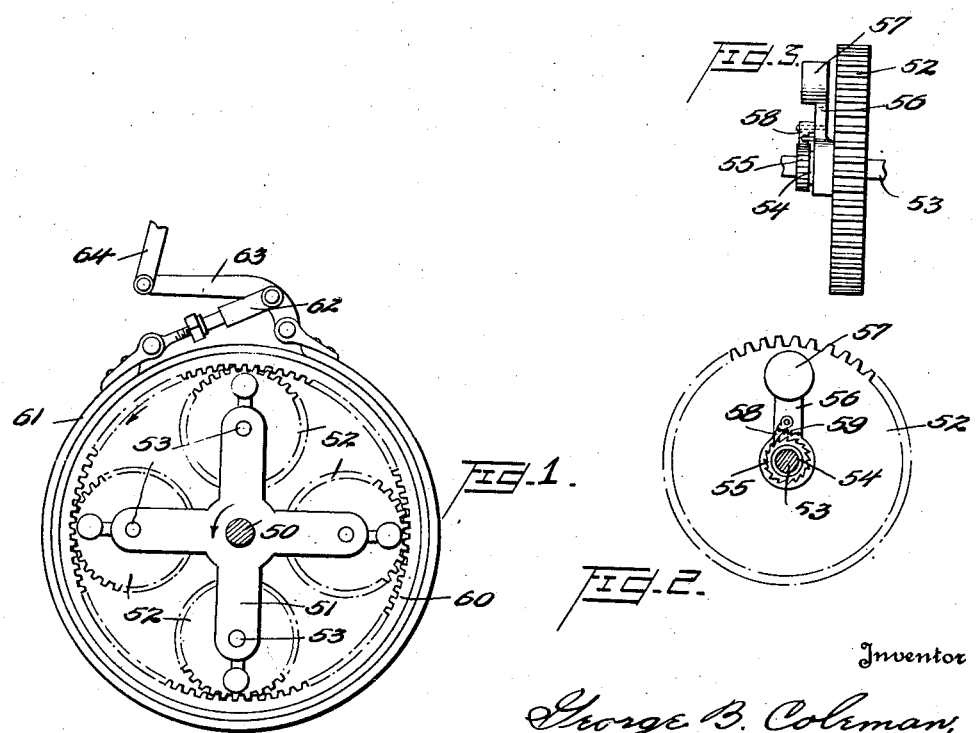
Inventor
George B. Coleman,
By Watson, Coit, Morse
 + Grindle.
Attorney Patented Jan. 3, 1928.

1,654,790

UNITED STATES PATENT OFFICE.

GEORGE B. COLEMAN, OF SAN FRANCISCO, CALIFORNIA, ASSIGNOR TO COLEMAN AUTOMATIC TRANSMISSION COMPANY, OF SAN FRANCISCO, CALIFORNIA, A CORPORATION OF CALIFORNIA.

ANTIFRICTION BRAKE.

Application filed December 9, 1924. Serial No. 754,852.

The present invention relates to braking devices and has for its object the provision of an efficient and compact device of general application although particularly adapted for use with motor vehicles. In accordance with my invention the speed of a rotatable member is retarded by inertia reactions rather than by friction forces such as commonly generated by friction drum and brake band or analagous devices.

The basic principles of the invention may be embodied in apparatus which differs widely in form and appearance and, while I illustrate and describe two forms of the invention, it will be understood that the design and arrangement of its component parts may be widely modified without departing from the spirit of the invention.

In the drawings:

Fig. 1 is a side elevation of portion of a retarding device embodying the invention;

Fig. 2 is a side elevation of one of the rotatable wheels looking in the same direction as the wheels are viewed in Figure 1; and Fig. 3 is an end view of this wheel showing its method of mounting.

In the form illustrated the rotatable shaft is indicated at 50, the single spider which is employed, at 51, and the four wheels or gears rotatably mounted on the ends of the spider arms at 52, 52. Each of these wheels is rotatably mounted on a short stud shaft 53 and has a sleeve portion 54 fixed thereto. Formed on this sleeve portion are ratchet teeth 55. A radial member 56 has its inner end rotatably mounted on the sleeve and has at its outer end a weight 57. This member is also provided with a pawl 58 adapted to engage the ratchet teeth 55 and a spring 59 for normally holding the pawl in such engagement. It will be seen therefore that the radial member 56 can rotate relatively to the sleeve freely in one direction but is locked against rotation in the opposite direction.

Each wheel 52 is in constant mesh with an internal floating ring 60 the outer face of which constitutes a cylindrical friction face adapted to be frictionally engaged by a brake band 61 adapted to be tightened or loosened by the usual brake operating levers 62, 63, 64 and connected mechanism.

In operation, with the brake band 61 in released position and the shaft 50 rotating, the spider 51, gearing 60, gears 52 and weights 57 rotate bodily therewith, the gears 52 being at rest on their own axes and the arms 56 directed radially outward due to the centrifugal force of the weights 57. To impose a braking action on the shaft 50, it is only necessary to actuate the brake band 61, when the ring 60 is brought to rest. The shaft 50, however, is not brought to rest by this operation but its continuous rotation, the spider 51 being carried by it, results not only in the continued bodily rotation of the gears 52 but also rotation on their own axes. The ratchets 55 rotating in synchronism with the gears 52 and the pawls 58 engaging the ratchets, the arms 56 are rotated on the axes of the gears 52 and the weights moved inwardly, until the arms reach radial positions with the weights disposed between the stud shafts 53 and the shaft 50. Having passed these inner radial positions, however, they are carried suddenly outwardly by centrifugal force, since then they may swing free of the gears 52. Having reached the outer radial positions, they would ordinarily remain there but the gears 52 rotating on their own axes, the weights are again swung inwardly by the engagement of the ratchets with the pawls and the same cycle of operation of the weights is repeated. The weights are thus successively moved inwardly against centrifugal force and this tends to resist the rotation of the gears 52 on their own axes and these successive oppositions to the axial rotation of the gears must oppose the rotation of the spider 51 and therefore the shaft 50, since the ring 60 is at rest and the shaft 50 can then rotate only by reason of the axial rotation of the gears 52. The mechanism thus provides for the application of a braking action on the shaft 50 by reason of providing a centrifugally controlled means governing the operative connection between the brake band 61 and the shaft 50.

Without departing from the spirit of the invention, various other braking or retarding devices may be devised and the invention is not limited to the forms thereof illustrated and above described but comprehends that the design and arrangement of its component parts may be modified to suit different purposes and conditions.

Having thus described the invention what is claimed as new and desired to be secured by Letters Patent is:

1. Mechanism for retarding or braking a rotatable member comprising an eccentrically weighted element having its axis disposed parallel to the axis of said revoluble member, said element being revoluble with said member along a circular path centered on the axis of said member and being also rotatable about its own axis, and means for causing rotation of said element on its axis in a direction opposite to the direction of rotation of said rotatable member, for the purpose set forth.

2. Mechanism for retarding or braking a rotatable member comprising an eccentrically weighted element having its axis disposed parallel to the axis of said revoluble member, said element being revoluble with said member along a circular path centered on the axis of said member and being also rotatable about its own axis, means for causing rotation of said element on its axis in a direction opposite to the direction of rotation of said rotatable member, said means including a ring concentric with said revoluble member and in constant engagement with said element.

3. Mechanism for retarding or braking a rotatable member comprising an eccentrically weighted element having its axis disposed parallel to the axis of said revoluble member, said element being revoluble with said member along a circular path centered on the axis of said member and being also rotatable about its own axis, means for causing rotation of said element on its axis in a direction opposite to the direction of rotation of said rotatable member, a ring member normally revoluble with said rotatable member and means for retarding the same.

4. Mechanism for retarding or braking a revoluble member comprising a plurality of rotatable eccentrically weighted elements connected to said member and bodily movable therewith, and means for causing said elements to rotate in a direction opposite to that of the revoluble member, for the purpose set forth.

5. In a brake, in combination a revoluble shaft, an internally toothed ring gear concentric therewith, rotatable eccentrically weighted gears carried by the shaft and meshing with said ring gear, the weighted gears being revoluble on their own axes and bodily revoluble with the shaft and means for holding said ring gear against rotation, for the purpose set forth.

6. A brake mechanism comprising normally synchronously moving members and means for retarding the one, and an inert element operatively connected with the other of said members and actuated to impose a restraining force on the same upon retardation of the first member.

7. A brake mechanism comprising a moving member, an inert element normally at rest with respect to the moving member, and means for effecting relative movement between the member and the inert element to impose a restraining force on the former.

8. A brake mechanism comprising a moving member, an inert element carried by and normally at rest with respect to the moving member, and means for effecting relative movement between the member and the inert element to impose a restraining force on the former.

9. A brake mechanism comprising normally synchronously moving members and means for arresting the motion of the one, and an inert element carried by and normally at rest with the other member but set in motion with respect thereto upon the retardation of the first member.

10. The method of absorbing the energy of motion, comprising the moving of a weight against centrifugal force.

11. The method of absorbing the energy of motion, comprising the successive moving of a weight against centrifugal force.

12. The method of absorbing the energy of motion which consists in the changing from synchronous to asynchronous operation a plurality of inert masses.

13. The method of absorbing the energy of motion which consists in successively changing from synchronous to asynchronous operation a plurality of inert masses.

In testimony whereof I hereunto affix my signature.

GEORGE B. COLEMAN.